(12) United States Patent
Broomer et al.

(10) Patent No.: US 8,281,604 B2
(45) Date of Patent: Oct. 9, 2012

(54) DIVERGENT TURBINE NOZZLE

(75) Inventors: Mark Broomer, Boston, MA (US); Victor Hugo Silva Correia, Milton Mills, MA (US); Robert Francis Manning, Newburyport, MA (US); Stephen Kin-Keung Tung, Andover, MA (US); Bhanu Mahasamudram Reddy, Boxford, MA (US)

(73) Assignee: General Electric Company, Schenectady, NY (US)

( * ) Notice: Subject to any disclaimer, the term of this patent is extended or adjusted under 35 U.S.C. 154(b) by 1330 days.

(21) Appl. No.: 11/957,539

(22) Filed: Dec. 17, 2007

(65) Prior Publication Data

US 2009/0155050 A1    Jun. 18, 2009

(51) Int. Cl.
*F02C 7/12* (2006.01)
(52) U.S. Cl. .......................... 60/806; 415/115
(58) Field of Classification Search .................. 415/115; 416/96 R, 96 A, 97 R; 60/806
See application file for complete search history.

(56) References Cited

U.S. PATENT DOCUMENTS

| 304,596 | A | 7/1962 | Bowmer |
| 365,686 | A | 4/1972 | De Feo |
| 461,697 | A | 10/1986 | Lings et al. |
| 555,572 | A | 9/1996 | Bournef et al. |
| 574,111 | A | 4/1998 | Clevenger et al. |
| 599,724 | A | 12/1999 | Tomita et al. |
| 6,155,778 | A * | 12/2000 | Lee et al. ............... 415/116 |
| 6,200,087 | B1 * | 3/2001 | Tung et al. ............. 415/115 |
| 6,270,317 | B1 | 8/2001 | Manning et al. |
| 6,354,797 | B1 | 3/2002 | Heyward et al. |
| 6,428,273 | B1 | 8/2002 | Keith et al. |
| 6,514,037 | B1 * | 2/2003 | Danowski et al. ....... 415/115 |
| 6,579,061 | B1 | 6/2003 | Heyward et al. |
| 6,929,446 | B2 * | 8/2005 | Lu et al. ............... 415/115 |
| 7,147,432 | B2 * | 12/2006 | Lowe et al. ............ 415/116 |
| 7,249,934 | B2 | 7/2007 | Palmer et al. |
| 7,921,654 | B1 * | 4/2011 | Liang ..................... 60/806 |
| 2007/0140849 | A1 | 6/2007 | Flodman et al. |

FOREIGN PATENT DOCUMENTS

| EP | 0 874 131 A2 | 10/1998 |
| EP | 1 108 856 A2 | 6/2001 |

OTHER PUBLICATIONS

General Electric Company, GE Aviation, Three photos of turbine nozzle designs found in US public use for more than 1 year before Dec. 1, 2007.

* cited by examiner

*Primary Examiner* — Ehud Gartenberg
*Assistant Examiner* — Vikansha Dwivedi
(74) *Attorney, Agent, or Firm* — General Electric Company; David J. Clement; William S. Andes

(57) ABSTRACT

A turbine nozzle includes a row of vanes extending radially in span between inner and outer bands. The vanes include opposite pressure and suction sidewalls and opposite leading and trailing edges. Each vane includes an inner pattern of inner cooling holes and an outer pattern of outer cooling holes distributed along the leading edge. The inner and outer holes diverge toward the corresponding inner and outer bands to preferentially discharge cooling air.

23 Claims, 4 Drawing Sheets

DIVERGENT TURBINE NOZZLE

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases. The gases flow downstream through a high pressure (HPT) turbine that extracts energy for powering the compressor.

And, a low pressure turbine (LPT) follows the HPT for extracting additional energy from the combustion gases for powering an upstream fan in a turbofan aircraft engine application, or for powering an external drive shaft for turboprop applications.

Engine efficiency is proportional to the maximum temperature of the combustion gases. However, combustion gas temperature is limited by the material strength of the various gas turbine engine components which are heated by the combustion gases.

The various flowpath components that adjoin the combustion gases during operation are typically cooled by bleeding a portion of the pressurized air from the compressor. Each component has a specifically configured and dedicated cooling circuit for locally maximizing cooling efficiency with a limited amount of cooling air.

Any cooling air diverted from the combustion process correspondingly reduces engine efficiency and is balanced against the desired life expectancy for the various engine components.

Since the combustion gases are born in the annular combustor immediately downstream of corresponding fuel injectors spaced circumferentially apart from each other, the combustion gases have a corresponding circumferentially sinusoidal temperature pattern.

And, since the annular flowpath for the combustion gases as they travel axially through the engine has radially outer and inner boundaries, the combustion gases also experience a radial profile which is initially parabolic with a maximum temperature near the radial midspan of the flowpath and lower temperatures near the outer and inner flowpath boundaries.

After entering the first stage turbine nozzle, the combustion gases are mixed in the various stages of turbine rotor blades downstream therefrom which changes both the circumferential and radial temperature distributions of the combustion gases due to the aerodynamic and centrifugal forces created thereby.

Each turbine nozzle stage includes a row of hollow vanes extending radially between outer and inner supporting bands. Each rotor stage includes a row of typically hollow turbine rotor blades extending radially outwardly from a supporting blade platform and dovetail mounted in a supporting rotor disk. And a stationary annular turbine shroud surrounds each row of turbine blades.

The nozzle vanes and turbine blades have corresponding airfoil configurations for guiding and extracting energy from the combustion gases. The nozzle bands, blade platforms, and turbine shrouds define the radially outer and inner flowpath boundaries for the combustion gases.

And each of these flowpath components typically includes a corresponding cooling circuit therefore. The inner root and outer tip of the turbine blades are typically more difficult to cool than the radial midspan portions of the airfoils. The nozzle inner and outer bands have different environments affecting the cooling configurations therefore. And, the turbine shrouds are suitably suspended above the blade tips and also have different cooling configurations.

Since the radially outer and inner turbine bands, blade platforms, and turbine shrouds define the outer and inner flowpath boundaries, the velocity of the combustion gases is relatively low therealong as compared to the midspan of the airfoils where gas velocity is at its maximum. Correspondingly, the heat flux from the combustion gases varies substantially in the radial direction and additionally varies as the circumferential pattern and radial profile of the combustion gases vary downstream from stage to stage.

Accordingly, the various cooling circuits for the various flowpath components typically include various forms of cooling holes for convection cooling, impingement cooling, and film cooling as dictated by the local conditions of the combustion gases and the temperature or heat generated thereby.

The prior art contains innumerable configurations of cooling circuits and cooling holes for gas turbine engine components all striving to maximize cooling efficiency while minimizing cooling air for effecting long life and durability of the engine components.

The specific configuration of the cooling circuits is designed for accommodating the local profile of the combustion gases to limit component temperature and stress within acceptable limits for durability and life.

Accordingly, it is desired to provide a turbine nozzle having improved cooling for the nozzle itself, as well as improving the temperature profile of the combustion gases discharged therefrom.

BRIEF DESCRIPTION OF THE INVENTION

A turbine nozzle includes a row of vanes extending radially in span between inner and outer bands. The vanes include opposite pressure and suction sidewalls and opposite leading and trailing edges. Each vane includes an inner pattern of inner cooling holes and an outer pattern of outer cooling holes distributed along the leading edge. The inner and outer holes diverge toward the corresponding inner and outer bands to preferentially discharge cooling air.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
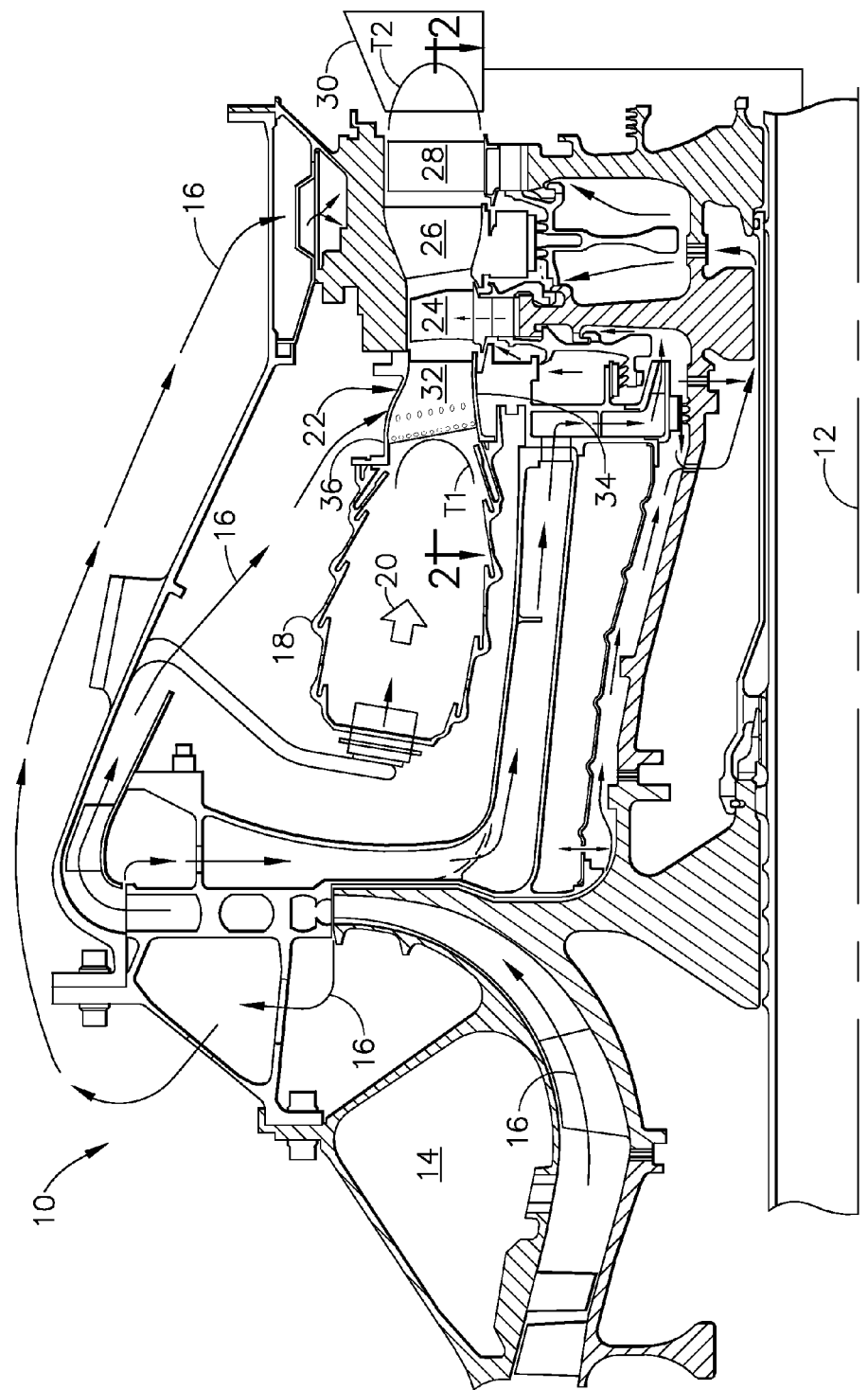
FIG. 1 is an axial sectional schematic view of a portion of a gas turbine engine including multiple turbine stages.

Illustrated schematically in FIG. 1 is a portion of a gas turbine engine 10 which is axisymmetrical about a longitudinal or axial centerline axis 12. The engine includes a multistage axicentrifugal compressor 14 (shown in aft part) configured for pressurizing air 16 during operation.

Directly following the compressor is an annular combustor 18 having a row of upstream fuel injectors which inject fuel into the pressurized air from the compressor for generating hot combustion gases 20 during operation.

Following the combustor are multiple turbine stages specifically configured for extracting energy from the hot combustion gases. A high pressure turbine (HPT) includes in serial flow communication a first stage turbine nozzle 22 followed by first stage turbine rotor blades 24, which in turn are followed by a second stage turbine nozzle 26 and corresponding second stage turbine rotor blades 28.

The two stage HPT is axisymmetrical around the centerline axis 12, and channels the annulus of combustion gases axially downstream to the low pressure turbine (LPT) 30.

The turbine rotor blades 24,28 extend radially outwardly from supporting rotor disks which in turn are joined by a first drive shaft to the rotor of the compressor 14 for providing power thereto. Each blade 24,28 has the typical airfoil extending from an integral platform at the root thereof to a radially outer tip.

The blades have corresponding dovetails mounted in corresponding dovetail slots in the perimeter of the two rotor disks. And, each row of blades 24,28 is surrounded by a corresponding turbine shroud.

The LPT 30 is illustrated schematically in FIG. 1 and includes one or more turbine stages, each having a corresponding turbine nozzle followed by a row of turbine rotor blades joined to another supporting rotor disk which powers an upstream fan or turboprop through another drive shaft in a typical aircraft engine configuration.

The basic engine 10 illustrated in FIG. 1 is conventional in configuration and operation and generates combustion gases 20 with the typical sinusoidal circumferential temperature pattern, and a parabolic radial temperature profile T1 at the annular aft outlet of the combustor 18.

The radial temperature profile T1 of the combustion gases 20 discharged from the annular combustor has a maximum or peak temperature near the radial midspan of the combustor outlet, with the temperature decreasing radially outwardly and inwardly therefrom where the combustion gases decrease in velocity along the outer and inner flowpath boundaries.

Figure 2:
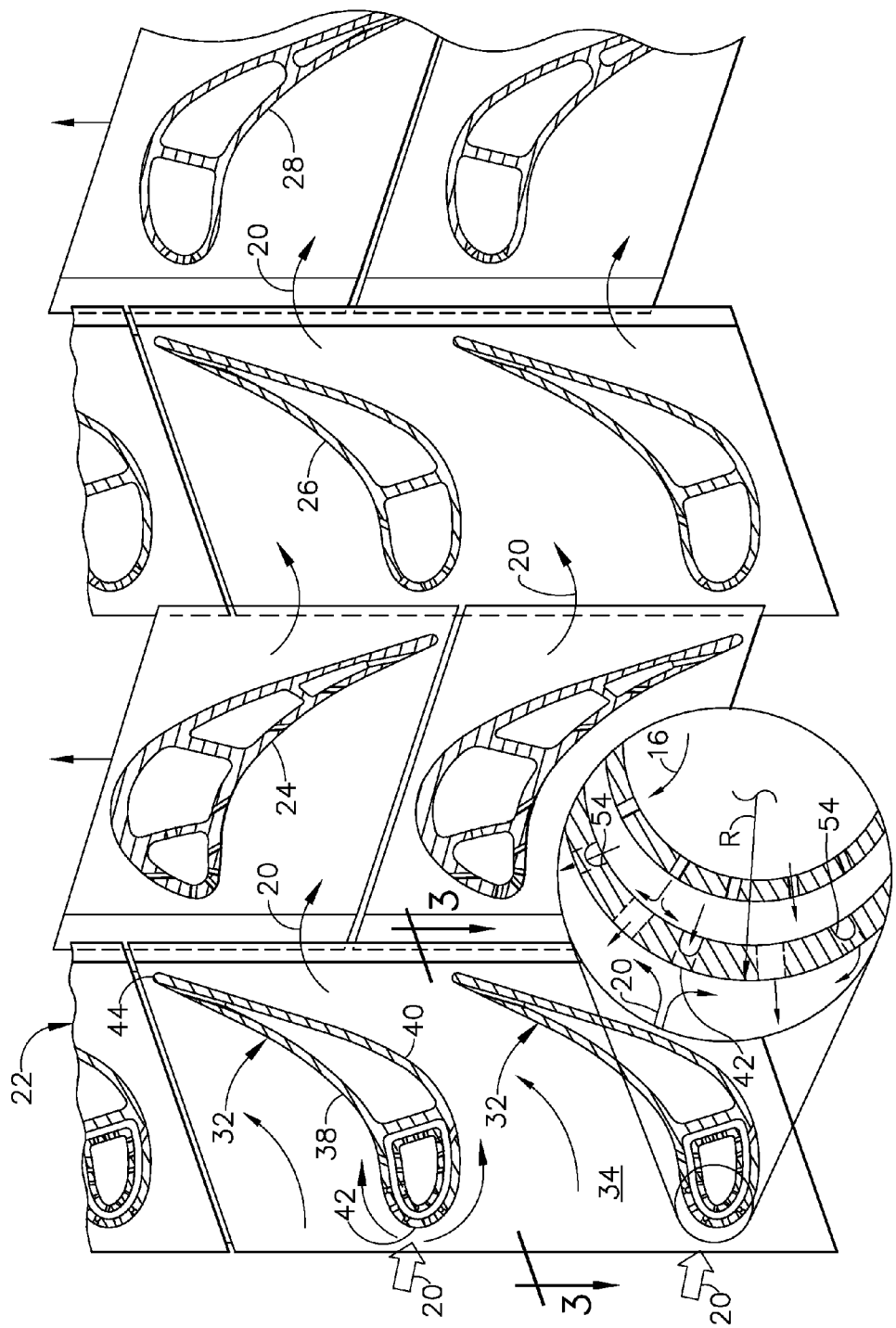
FIG. 2 is a planiform view of the turbine stages illustrated in FIG. 1 and taken along line 2-2.

FIG. 2 illustrates the typical serpentine flowpath for the combustion gases 20 as they flow downstream from the combustor through the two stages of the high pressure turbine. The turbine nozzles 22,26 are stationary and channel the combustion gases downstream with corresponding discharge swirl angles into the corresponding rows of turbine rotor blades 24,28. The rotating blades extract energy from the combustion gases to power the upstream compressor and correspondingly change both the circumferential and radial temperature profiles of the combustion gases 20 in the process.

In typical practice, the turbine stages flatten the radial parabolic temperature profile T1 illustrated in FIG. 1 to reduce the differences in maximum and minimum temperature over the radial span of the flowpath, and also typically move the maximum temperature of the profile radially outward in the outer span of the flowpath.

As indicated above, the various turbine components which bound the hot combustion gases are typically cooled against the local variations in combustion gas temperature. Since the temperature profile of the combustion gases varies in the different turbine stages, the cooling configurations for the corresponding flowpath components also vary to maximize cooling efficiency while minimizing cooling air bled from the compressor.

Figure 3:
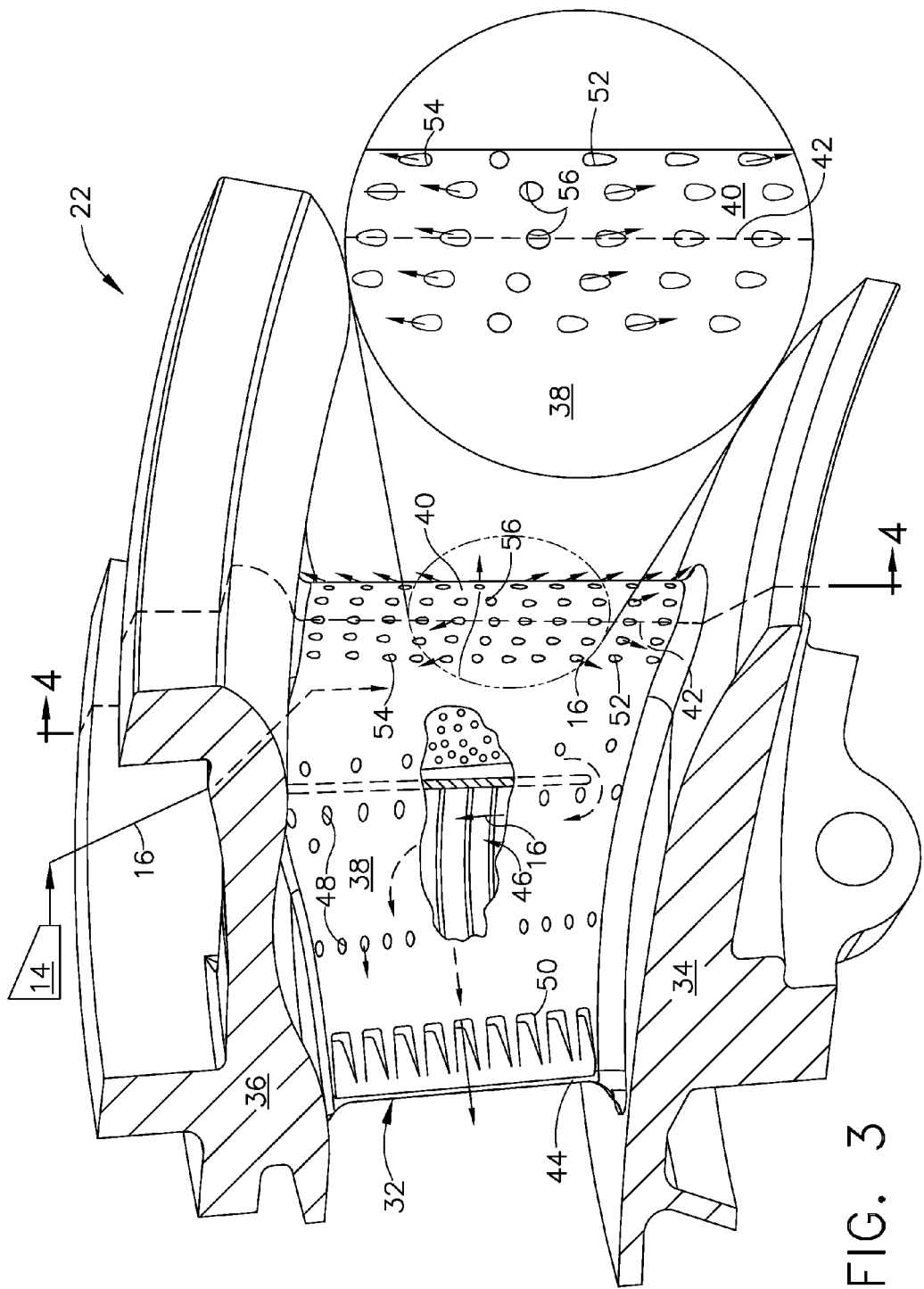
FIG. 3 is a isometric view of an exemplary first stage turbine nozzle vane illustrated in FIG. 2 and taken along line 3-3.

A representative portion of the first stage turbine nozzle 22 illustrated in FIG. 1 is shown in more detail in FIG. 3. The nozzle include an annular row of hollow nozzle vanes 32 extending radially in span between laterally surrounding inner and outer arcuate bands 34,36. The basic configuration of the turbine nozzle may be conventional with an individual vane 32 cast in a singlet with arcuate portions of the inner and outer bands 34,36 being cantilevered both axially and circumferentially therefrom.

Two of these singlets may then be brazed together in the corresponding doublets illustrated in FIG. 2, with each doublet having two vanes joined to integral inner and outer band segments. The doublets are separated circumferentially from each other in the full row by axial splitlines containing conventional spline seals.

As shown in FIGS. 2 and 3, each of the vanes 32 includes a generally concave pressure sidewall 38 and a circumferentially opposite, generally convex suction sidewall 40. The two sidewalls 38,40 extend radially in span between the two bands 34,36 and are integrally joined thereto in the common casting construction, for example.

The two arcuate sidewalls 38,40 have the typical crescent airfoil profile extending axially in chord between axially opposite leading and trailing edges 42,44 which extend the full radial span of each vane.

Each of the vanes 32 illustrated in FIGS. 2 and 3 includes an internal cooling circuit 46 suitably disposed in flow communication with the compressor 14 for bleeding a portion of the pressurized cooling air or coolant 16 therefrom. The cooling circuit 46 may have any conventional configuration and typically includes one or more internal flow passages extending radially inside the vane which discharge spent cooling air through various rows of conventional film cooling holes 48 distributed over the vane sidewalls, and through a row of pressure-side outlet holes 50 terminating closely adjacent to the trailing edge 44.

The first stage turbine nozzle 22 described above and illustrated in the Figures may have any conventional configuration and operation and is suitably modified hereinbelow for substantial improvement. Accordingly, any other type of first stage turbine nozzle may also be similarly modified to enjoy corresponding benefits.

More specifically, each of the nozzle vanes 32 initially illustrated in FIG. 3 includes a radially inner or lower pattern of inner cooling holes 52 radially distributed along the lower half of the leading edge 42 to the inner band 34, and correspondingly a radially outer pattern of outer cooling holes 54 distributed radially along the upper half of the leading edge 42 to the outer band 36.

The inner holes 52 are inclined radially inwardly toward the surrounding inner band for discharging the spent cooling air 16 from inside the hollow vane and outwardly through the sidewalls toward the inner band. The outer holes 54 are inclined radially outwardly toward the surrounding outer band 36 to discharge another portion of the spent cooling air 16 outwardly through the sidewalls toward the outer band.

The inner and outer patterns of cooling holes 52,54 accordingly diverge or spread radially away from each other from inside to outside the vanes along the airfoil leading edge between the inner and outer bands against the incident combustion gases discharged from the combustor.

Figure 4:
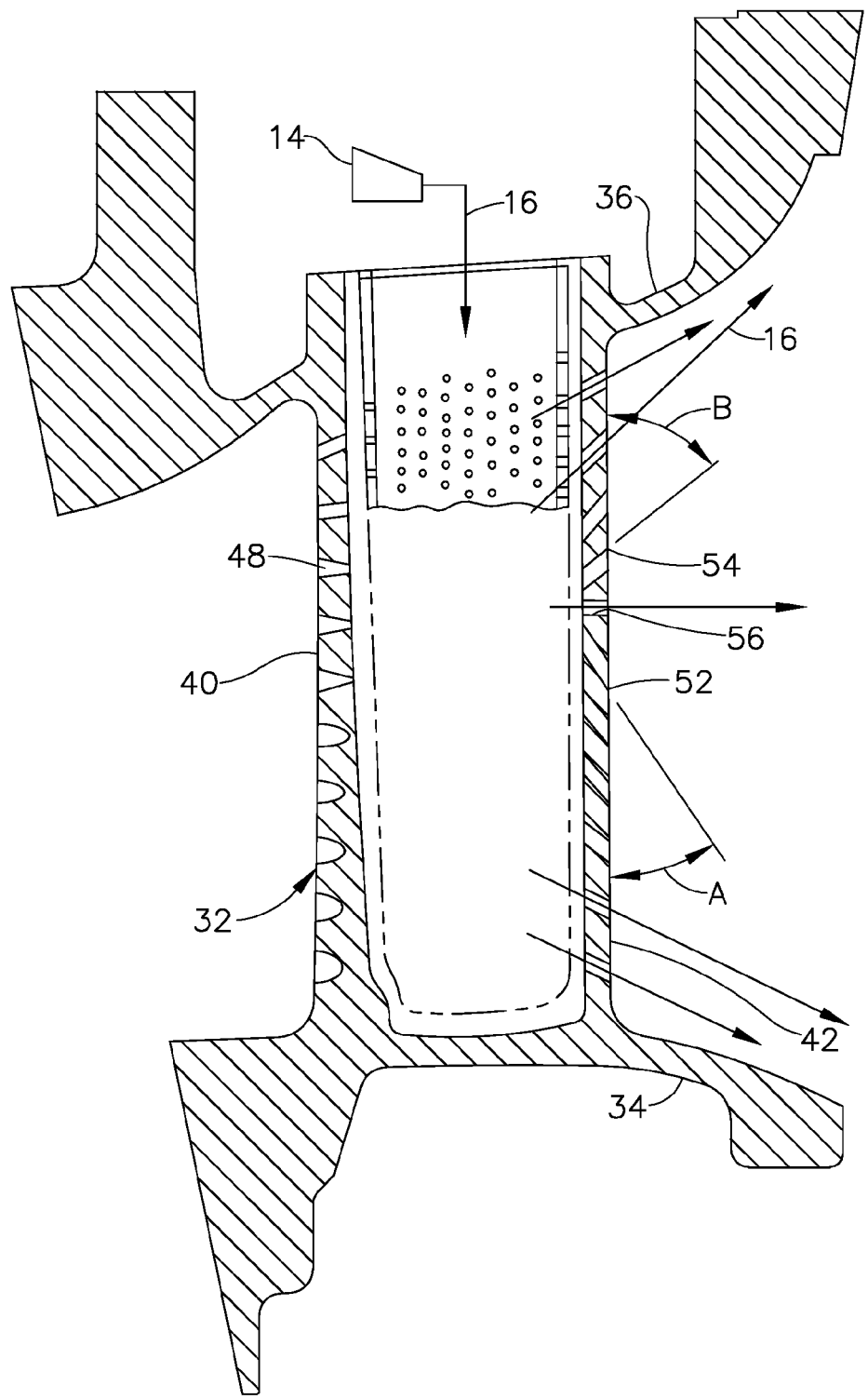
FIG. 4 is a radial sectional view through the nozzle vane illustrated in FIG. 3 and taken along line 4-4.

FIG. 4 illustrates an exemplary radial row or column of the diverging holes 52,54 in radial section along the leading edge 42. The inner holes 52 have a shallow first inclination angle A relative to the external radial surface of the vane, which inclination angle is radially inwardly toward the forward inner band 34 portion externally surrounding the leading edge.

Correspondingly, the outer holes 54 have an opposite shallow second inclination angle B diverging radially from the inner holes and also relative to the external radial surface of the vane, with the second inclination angle being radially outwardly toward the forward outer band 36 portion externally surrounding the leading edge.

Both inclination angles A,B are shallow or substantially acute and less than 90 degrees. The initial or fundamental purpose of the inclined holes 52,54 is for providing both internal convection cooling of the vane sidewalls where they are located as well as providing external film cooling.

Film cooling holes are conventionally known and have relatively shallow inclination angles to discharge the spent cooling along the external airfoil surface while maintaining substantial flow attachment with little if any undesirable detachment or flow lift-off. Preferred inclination angles A,B are about 28 degrees from the flow surface for providing both film cooling and preferred modification of the radial temperature profile of the combustion gases, but may be limited by the method of hole drilling.

For example, FIG. 4 illustrates the integral outer and inner bands 34,36 which extend or cantilever laterally outwardly from the opposite ends of the nozzle vane 32 itself in the exemplary singlet casting manufacture thereof. Accordingly, the bands 34,36 themselves interfere with the drilling of the cooling holes 52,54 due to their overhang.

The holes 52,54 may be manufactured by any conventional process, such as by laser drilling or by electrical discharge machining (EDM), which both require a straight line-of-sight for the drilling process. Near the midspan of the vane 32, the outer and inner bands 34,36 provide minimal overhang obstruction and permit the corresponding holes 52,54 to be drilled relatively shallow down to about the 28 degree preferred inclination angle.

However, the outer and inner bands 34,36 overhang the opposite ends of the vane 32 and obstruct the shallow line of sight for hole drilling and therefore the holes 52,54 closely adjacent to the two bands 34,36 have correspondingly larger inclination angles A,B which may be about 40 degrees or 50 degrees and larger, but nevertheless less than 90 degrees where practical closely adjacent to the adjoining bands.

Accordingly, the inner holes 52 vary in the first inclination angle A from the midspan of the vane adjoining the outer pattern to the inner band 34. Correspondingly, the outer holes 54 also vary in the opposite, second inclination angle B from the midspan near the inner pattern to the outer band 36.

In the preferred embodiment illustrated in FIG. 3, both the inner and outer patterns of inner and outer holes 52,54 laterally or circumferentially bridge corresponding minor portions of the pressure and suction sidewalls 38,40 along the leading edge 42.

For example, the inner and outer holes 52,54 may be distributed or arranged in radial rows or columns generally parallel to the leading edge 42 between the inner and outer bands 34,36.

Furthermore, the inner and outer patterns of holes 52,54 may also include common radial columns of the inner and outer holes 52,54 extending radially over the full span of the vane along the leading edge.

In the exemplary embodiment illustrated in FIG. 3, the inner and outer hole patterns include multiple, for example five, radial columns of the inner and outer holes 52,54 spaced laterally or circumferentially apart from each other and from the leading edge 42 along both the pressure and suction sidewalls 38,40 to wrap around the stagnation portion of the leading edge 42 in a full complement of showerhead holes.

More specifically, FIG. 2 illustrates an enlarged portion of the vane leading edge 42. The external curvature of the vane leading edge may be defined circumferentially or laterally by an arcuate portion of a circle having a radius R. The leading edge 42 may be conventionally defined by aerodynamic analysis as the nominal location on the vane airfoil at which the incident combustion gases 20 stagnate and split correspondingly along the opposite pressure and suction sidewalls.

The leading edge and corresponding stagnation point of the combustion gases may be designed for a particular engine condition, such as cruise operation in an aircraft engine, or any desired operating point. And during operation, the combustion gases will stagnate and split within a small variation of the design point leading edge location.

Accordingly, one or more of the radial columns of diverging cooling holes 52,54 may be located at the leading edge of each vane, with multiple columns being used to bridge the leading edge laterally over the full extent of the combustion gas stagnation region in which the combustion flow Mach number is relatively low.

In this way, the diverging cooling holes 52,54 not only effectively cool the leading edge of each vane against the heat influx from the incident combustion gases, but significantly alter the radial temperature profile of those combustion gases. Analysis and component tests of inwardly incline cooling holes and outwardly inclined cooling holes confirm that the discharged coolant from the leading edge holes can significantly reduce the radial temperature profile of the combustion gases near both the inner band as well as the outer band.

Furthermore, the analysis and tests confirm that the temperature-reducing effect of the diverging leading edge holes 52,54 can extend downwardly through multiple stages of the turbine and possibly including the LPT 30 illustrated in FIG. 1 for the exemplary small engine class represented therein.

The exemplary patterns of inner and outer holes 52,54 illustrated in FIG. 3 may be sized to significantly dilute the incident combustion gases 20 to effect a radially parabolic second temperature profile T2 illustrated schematically in FIG. 1 in the downstream turbine stages, between the discharge end of the HPT and the inlet end of the LPT, which is not only different than the original radial temperature profile T1 at the combustor outlet, but substantially different than would otherwise occur with conventional leading edge showerhead hole configurations.

As indicated above, the original parabolic temperature profile T1 at the combustor outlet is substantially flattened in downstream turbine stages in a conventional engine which substantially reduces the difference between the minimum and maximum temperatures in the profile, and typically moves the maximum temperature radially outwardly in the flowpath span.

In contrast, the diverging leading edge cooling holes 52,54 can be sized to substantially dilute the combustion gases near both inner and outer bands and correspondingly reduce the temperature of the combustion gases themselves near the bands to sharpen or effect the desired radial parabolic temperature profile T2 illustrated in FIG. 1.

The relatively simple modification or introduction of the diverging cooling holes 52,54 in the leading edge stagnation region of each vane can have profound effects in many downstream components along the flowpath. In particular, since the radial temperature is significantly reduced along the radially outer flowpath of the combustion gases, the radially outer flowpath components will experience a reduction in combustion gas temperature and heat flux therefrom, which correspondingly permit a reduction in the cooling air requirements therefore.

The simple modification of the first stage turbine nozzle cooling at the leading edge therefore permits corresponding modifications in the downstream flowpath components for reducing their cooling air requirements, and correspondingly further increasing engine efficiency.

Furthermore, by reducing the combustion gas temperature near the outer bands and turbine shrouds, the durability thereof may be enhanced for maximizing the useful life thereof, while also increasing engine performance.

Since the original radial temperature profile T1 is parabolic as illustrated in FIG. 1, the maximum temperature of the combustion gases covers the midspan region of the nozzle vanes at about 50 percent span height, and including for example an additional 25 percent span height both radially outwardly and radially inwardly therefrom.

Accordingly, the two patterns of diverging cooling holes 52,54 as illustrated in FIG. 3 have a transition region located generally in radial alignment with the maximum radial temperature of the combustion gases which typically occurs at or near the vane midspan. Since the inner and outer holes 52,54 diverge at opposite inclination angles A,B, they may be radially staggered from column to column to additionally ensure effective cooling of the vane leading edge itself in this transition region against the hot incident combustion gases.

For additional cooling efficacy, a plurality of transition cooling holes 56 may be distributed laterally along the leading edge 42 of each vane 32 near the midspan thereof to radially adjoin together the inner pattern of inner holes 52 with the outer pattern of outer holes 54.

The transition holes 56 are preferably arranged in a single lateral or circumferential row bridging the pressure and suction sidewalls 38,40 around the leading edge 42 as illustrated in FIG. 3. The transition holes 56 are neither inclined radially inwardly or outwardly, like the adjoining inner and outer holes, but are preferably disposed substantially perpendicular to the sidewalls of the vane at about 90 degrees both radially and circumferentially.

As shown in FIG. 4, the collective patterns of inner holes 52, outer holes 54, and center transition holes 56 effect a radially diverging or fan pattern of holes along the leading edge to discharge the spent cooling air in a fan pattern into the incident combustion gases. As indicated above, the combustion gases stagnate at the vane leading edge and have substantially minimal velocity, whereas the spent cooling air is discharged through the leading edge holes 52,54,56 in corresponding jets of cooling air with significant momentum for correspondingly diluting the lower-momentum incident combustion gases.

The inner holes 52, the outer holes 54, and the transition holes 56 illustrated in FIG. 3 preferably have substantially equal flow diameters in the range of typical showerhead cooling holes and may be about 15-20 mils (0.38-0.51 mm). The inclination angles A,B of the inner and outer holes 52,54 are preferably radial only, without lateral inclination and are therefore substantially perpendicular to the sidewalls 38,40 in the lateral direction.

The preferred angular orientation of the leading edge showerhead holes 52,54,56 illustrated in FIG. 3 exhibit a distinctive pattern. More specifically, these showerhead holes have generally circular or cylindrical profiles which terminate in corresponding outlets on the external surface of the vane around the leading edge.

The middle transition holes 56 are arranged in a lateral row having circular outlets due to their perpendicular orientation.

The inwardly inclined inner holes 52 have radially elliptical or oval outlets along the leading edge that are sharper at their lower edges than at their upper edges due to their breakout on the curved leading edge.

And, the outwardly inclined outer holes 54 similarly have elliptical or oval outlets along the leading edge that are sharper along their outer edges than along their inner edges, in the form of a teardrop, due again to their breakout on the curved leading edge.

Although showerhead holes are common in conventional gas turbine engine nozzle vanes, they are typically identical in configuration and orientation for locally cooling the vane leading edge and initiating film cooling downstream therefrom along the opposite pressure and suction sides.

With the relatively simple modification of common showerhead holes to produce the unique diverging pattern illustrated in FIG. 3, for example, not only can the nozzle vane itself be adequately cooled along the leading edge and initiate downstream film cooling, but the diverging cooling holes may significantly affect the radial temperature profile of the incident combustion gases in the stagnation region.

The temperature of the radially outer and inner portions of the combustion gases may be significantly reduced as the gases travel downstream through the turbine nozzle and in the succeeding turbine stages, which permits significant reductions in cooling air requirements for all flowpath components subject to the reduced combustion gas temperature.

And, this improvement in cooling performance may be effected without otherwise increasing the cooling air requirements of the first stage turbine nozzle itself, especially at the improved leading edge showerhead hole configuration thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine comprising:
   an annular combustor configured for discharging combustion gases;
   a turbine nozzle following said combustor and including a row of nozzle vanes extending radially between laterally surrounding inner and outer bands;
   a row of turbine rotor blades following said nozzle for extracting energy from said combustion gases;
   each of said nozzle vanes including circumferentially opposite pressure and suction sidewalls extending radially in span between said bands and extending axially in chord between opposite leading and trailing edges; and
   each vane further including inner and outer patterns of corresponding inner and outer cooling holes distributed along said leading edge and inclined oppositely inwardly toward said inner band and outwardly toward said outer band, respectively, wherein said inner cooling holes are disposed along a lower half of said leading edge adjacent said inner band, and said outer cooling holes are disposed along an upper half of said leading edge adjacent said outer band.

2. An engine according to claim 1 wherein said inner and outer patterns include multiple radial columns of said inner and outer holes spaced laterally apart along both said pressure and suction sidewalls parallel to said leading edge.

3. An engine according to claim 2 further comprising a plurality of transition holes distributed along said leading edge of said vanes near the midspan thereof to radially adjoin said inner pattern of inner holes with said outer pattern of outer holes.

4. An engine according to claim 3 wherein said inner holes have an acute first inclination angle radially inwardly toward said inner band, and said outer holes have an opposite acute second inclination angle diverging radially outwardly toward said outer band.

5. An engine according to claim 4 wherein said inner and outer patterns include common radial columns of said inner and outer holes.

6. An engine according to claim 4 wherein said transition holes are arranged in a lateral row bridging said pressure and suction sidewalls around said leading edge.

7. An engine according to claim 4 wherein said inner holes vary in said first inclination angle from said outer pattern to said inner band, and said outer holes vary in said second inclination angle from said inner pattern to said outer band.

8. An engine according to claim 4 wherein said transition holes are substantially perpendicular to said sidewalls.

9. An engine according to claim 4 wherein said inner holes, outer holes, and transition holes have substantially equal flow diameters, and are disposed laterally perpendicular to said sidewalls.

10. An engine according to claim 4 wherein:
said combustor is configured to effect a radial parabolic first temperature profile in said combustion gases discharged to said nozzle; and
each of said nozzle vanes includes an internal cooling circuit for discharging a coolant through said diverging inner and outer holes to dilute said combustion gases to effect a different radially parabolic second temperature profile through said downstream rotor blades.

11. A gas turbine nozzle comprising:
a row of hollow nozzle vanes extending radially in span between laterally surrounding inner and outer bands;
each vane including circumferentially opposite pressure and suction sidewalls extending radially between said bands and extending axially in chord between leading and trailing edges; and
each vane further including an inner pattern of inner cooling holes distributed along said leading edge and inclined inwardly toward said inner band, and a diverging outer pattern of outer cooling holes distributed along said leading edge and inclined outwardly toward said outer band, wherein said inner cooling holes are disposed along a lower half of said leading edge adjacent said inner band, and said outer cooling holes are disposed along an upper half of said leading edge adjacent said outer band.

12. A nozzle according to claim 11 wherein said inner holes have an acute first inclination angle radially inwardly toward said inner band, and said outer holes have an opposite acute second inclination angle diverging radially outwardly toward said outer band.

13. A nozzle according to claim 12 wherein said inner holes vary in said first inclination angle from said outer pattern to said inner band, and said outer holes vary in said second inclination angle from said inner pattern to said outer band.

14. A nozzle according to claim 12 wherein both said inner and outer patterns of inner and outer holes laterally bridge said pressure and suction sidewalls along said leading edge.

15. A nozzle according to claim 14 wherein said inner and outer holes are distributed in radial columns parallel to said leading edge.

16. A nozzle according to claim 14 wherein said inner and outer patterns include common radial columns of said inner and outer holes.

17. A nozzle according to claim 14 wherein said inner and outer patterns include multiple radial columns of said inner and outer holes spaced laterally apart along both said pressure and suction sidewalls around said leading edge.

18. A nozzle according to claim 14 further comprising a plurality of transition holes distributed along said leading edge of said vanes near the midspan thereof to radially adjoin said inner pattern of inner holes with said outer pattern of outer holes.

19. A nozzle according to claim 18 wherein said transition holes are arranged in a lateral row bridging said pressure and suction sidewalls around said leading edge.

20. A nozzle according to claim 19 wherein said transition holes are substantially perpendicular to said sidewalls.

21. A nozzle according to claim 18 wherein said inner holes, outer holes, and transition holes have substantially equal flow diameters, and are disposed laterally perpendicular to said sidewalls.

22. A nozzle according to claim 14 wherein each of said vanes includes an internal cooling circuit for discharging a coolant through said diverging inner and outer holes.

23. A nozzle according to claim 14 in combination with downstream turbine stages and an upstream combustor for discharging combustion gases with a radially parabolic first temperature profile through said nozzle, and said inner and outer holes are sized to dilute said combustion gases to effect a different radially parabolic second temperature profile in said downstream turbine stages.

* * * * *